INVENTORS.
RICHARD G. BEARDSLEY
EUGENE P. CRAVEN
JAMES M. NORMAN
BY
George C. Sullivan
Agent INVENTORS.
RICHARD G. BEARDSLEY
EUGENE P. CRAVEN
JAMES M. NORMAN
BY
Agent INVENTORS.
RICHARD G. BEARDSLEY
EUGENE P. CRAVEN
JAMES M. NORMAN
BY
George C. Sullivan
Agent United States Patent Office 3,359,821
Patented Dec. 26, 1967

3,359,821
CONNECTING MECHANISM BETWEEN A CONTROL LEVER AND MULTIPLE CONTROLLED MEMBERS
Richard G. Beardsley, Eugene P. Craven, and James M. Norman, Atlanta, Ga., assignors to Lockheed Aircraft Corporation, Burbank, Calif.
Filed Oct. 11, 1965, Ser. No. 494,673
11 Claims. (Cl. 74—471)

ABSTRACT OF THE DISCLOSURE

A simple, compact mechanism is provided by which the rudder and wheel brake systems of an aircraft may be operated. This mechanism has particular significance where floor and cab are so situated that there is not sufficient space to employ a conventional rudder pedal linkage system. It operates in such a way as to reduce system slope and backlash, minimize possibility of system jam and reduce systems operating loads.

---

This invention relates in general to connecting linkage operative between a control lever and multiple controlled members whereby a distinct movement of the control lever actuates each respective controlled member independently of the others. Such linkage is commonly employed in certain vehicles where movement of a single operator's lever in different planes actuates multiple devices or mechanisms necessary for the total operation and performance of the vehicle.

In aircraft for example different external flight control surfaces are actuated by a single pilot's control stick. Also, the pilot's control pedal for the vertical stabilizer or rudder is often connected to the brake system whereby linear movement thereof adjusts the rudder position while rotary movement thereof operates the brakes. In such composite or integrated control systems it is essential that the operation of each unit or mechanism be separate and distinct so as not to affect another. This has heretofore been accomplished by means of and through individual linkage trains between the single control lever and each controlled member which necessarily become space-consuming due to the directional changes in movement of the constituent links making up each train. In many cases such space is not available within the aircraft.

Moreover, linkage trains because of their very composition have or develop in service lost motion due to their multiple joints and their articulate movement as well as the deflecton inherent in their component links. At the same time these linkage trains are prone to jam or otherwise fail because of their exposure, especially during servicing and maintenance of the vehicle, unless properly housed or otherwise protected.

The present invention is therefore directed to an improved connecting mechanism which when interposed between a control lever and the multiple controlled members to be actuated thereby occupies a minimum space so as to be mounted within vehicle structure of minimum thickness. This connecting mechanism and its operating components are thereby substantially protected against all damage which can cause the operating system to fail or jam as well as being materially reduced in size and weight itself and in the vehicle structure required to contain and support it.

Also, the design and construction of the mechanism herein proposed is such that the number of links and joints therein are appreciably less than are required in prior mechanical linkages. Lost motion, deflection, etc., inherent in previous such linkage are thereby virtually eliminated, and a relatively direct connection is effected between the control and controlled ends thereof so that the loss of motion or loss of word transmitted from the input to the output is greatly reduced.

In broadest structural terms the connecting mechanism herein contemplated comprises a pair of adjacent, parallel links connected at one of their corresponding ends one to each controlled member, and at their other corresponding ends to the control lever. One of these links is operative for linear movement in unison exclusively with one of the controlled members, while the other for rotary movement in unison exclusively with the other controlled member. As an additional feature, means is provided for adjustment of the effective length of these links to permit pre-positioning of the control lever to a selected position for the convenience and comfort of individual operators.

With the above and other objects in view as will be apparent this invention consists in the construction, combination and arrangement of parts all as hereinafter more fully described, claimed and illustrated in the accompanying drawings wherein:

Figure 1:
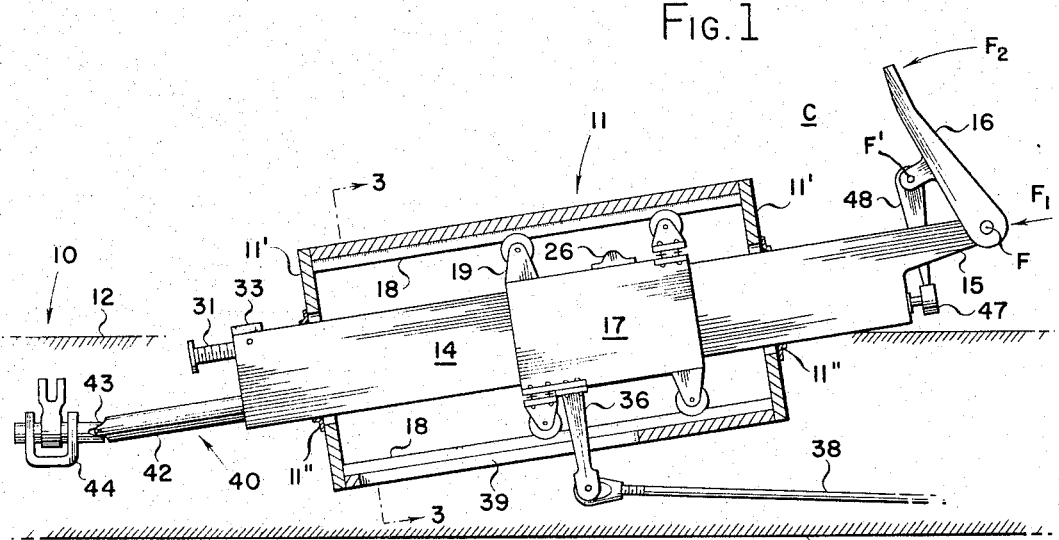
FIGURE 1 is a side view partly in section af a connecting mechanism constructed in accordance with the teachings hereof shown mounted in the floor of a vehicle with the single control lever located inside the vehicle, only a fragment of the floor and the related parts of the vehicle being indicated generally.
Figure 2:
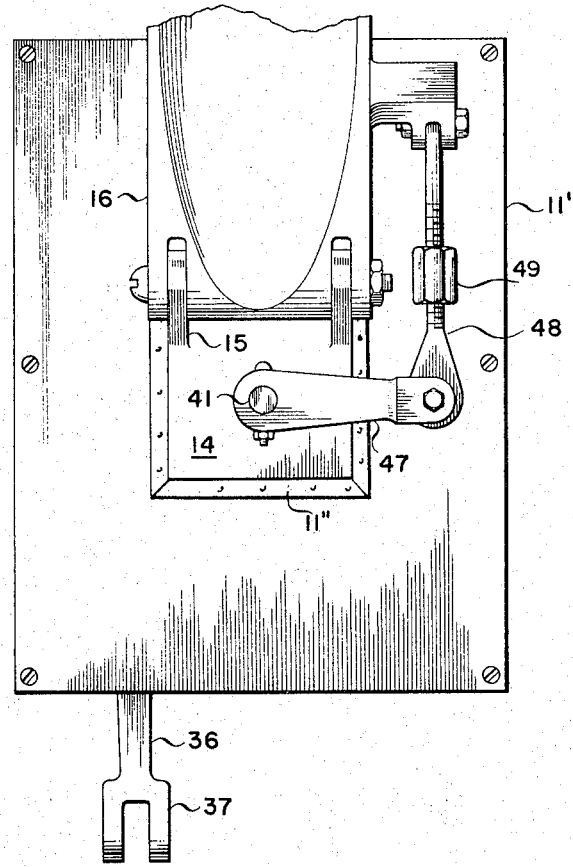
FIGURE 2 is an end view of the arrangement shown in FIGURE 1 taken from the right side thereof, only the lower portion of the control lever being shown.
Figure 4B:
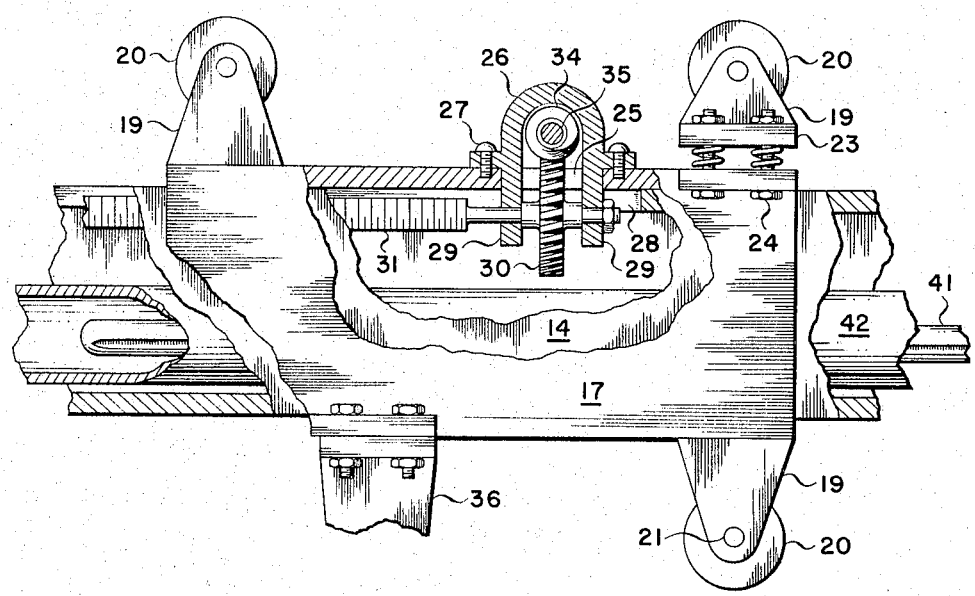
FIGURES 4A, 4B and 4C are flow sheets showing the connecting mechanism illustrated in FIGURE 1, however at a substantially larger scale and with parts broken away to reveal operating components thereof which constitute salient features of the invention.
Figure 3:
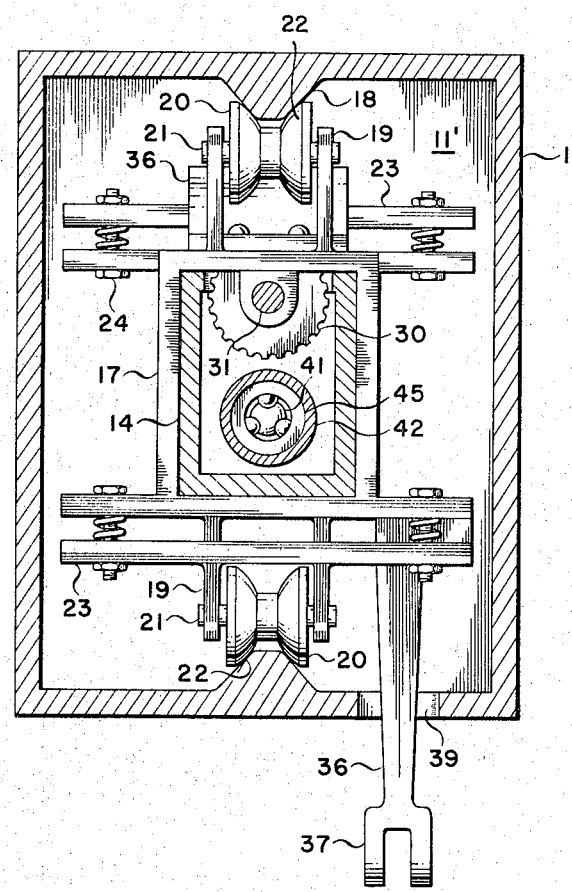
FIGURE 3 is a section taken along line 3—3 of FIGURE 1.
Figure 4A:
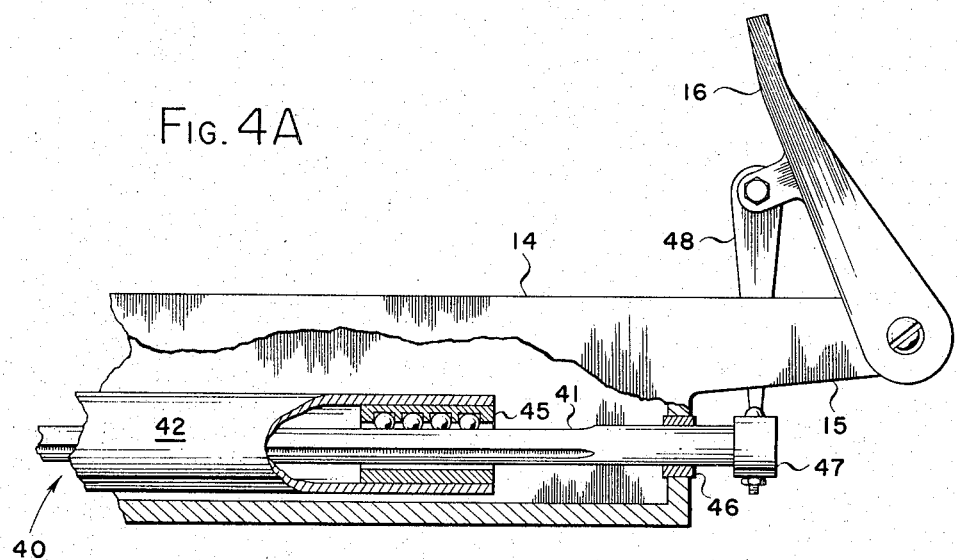
Figure 4C:
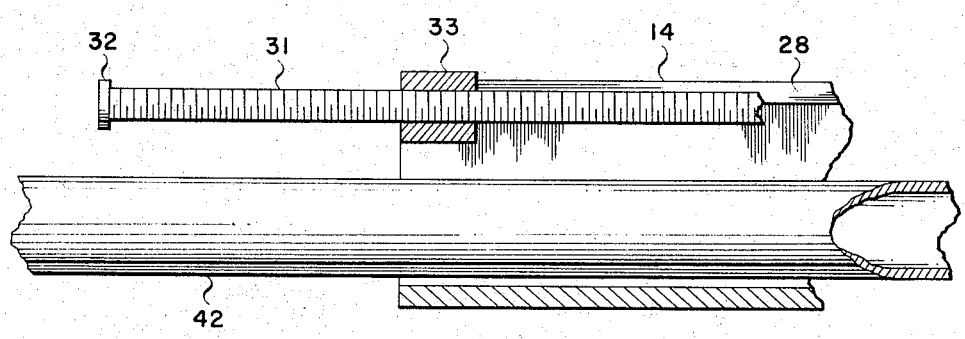

Reference being had more particularly to the drawings, 10 designates stationary structure of a vehicle, such as for example the floor of an aircraft having an opening in the upper surface thereof to receive and mount a housing member 11. The floor 10 is formed by a pair of spaced sheets, panels or the equivalent defining upper and lower surfaces 12 and 13, respectively, and interconnected by suitable supports or ribs as often employed to give it structural rigidity and integrity with internal spaces and passageways to accommodate various components and mechanisms required for operation of the vehicle or aircraft.

The housing 11 is preferably rectangular and hollow, closed at opposite ends by removable walls 11' having central aligned openings therein defined by appropriate seals 11''. Thus constructed, the housing 11 is immovably secured in any conventional manner at and along its sides to the floor structure 10 to form in effect an integral part thereof, being disposed with its longitudinal dimension in an angular plane relative to the upper surface 12 of the floor 10. The lower or outer end of the housing 11 is thereby located substantially within the space between surfaces 12 and 13 while its upper or inner end is located generally outside of such space and within the control cabin or cockpit C of the aircraft. This angular position of the housing 11 is intended to establish an optimum position with respect to the operator of the vehicle, as will become more apparent.

Coaxially mounted within the housing 11 and extending beyond both ends thereof is a hollow box beam 14 that terminates at its inner end within the cabin C of the aircraft in an integral arm 15 adapted to pivotally connect at its outer end with an operator's lever or pedal 16 at the fulcrum F thereof. This beam 14 is maintained in such position by means of and through a carriage 17 operative between it and the adjacent walls of the housing 11.

More specifically, the inner surfaces of the upper and lower walls of the housing 11 are each formed or otherwise provided with a guide 18 that extends the length thereof. The carriage 17 is slidably mounted on the beam 14 being of box cross section corresponding to, but slightly larger than, the beam 14 to enclose it and be supported thereon in substantially all lateral directions. Associated with the upper and lower sides of the carriage 17 to be disposed centrally thereof are a pair of spaced parallel arms 19 which project therefrom toward the associated housing wall. A freely rotatable roller 20 is mounted between each such pair of arms 19 on an axle 21 carried by and extending between the arms 19. Each roller 20 is thereby located in the plane of the associated guide 18 with which it is adapted to coact in constant engagement. To ensure such engagement and at the same time to avoid undue friction therebetween, the surface of each guide 18 is tapered to extend between corresponding surfaces of its associated roller 20, which roller surfaces are convex as at 22 to reduce the area of contact therebetween.

The two prime load carrying rollers 20 are fixed directly to the carriage 17 and the other rollers 20 are resiliently mounted thereon. Thus, the arms 19 adjacent diagonally opposite ends of the carriage 17 are integrally formed on the sides of the carriage, while the other arms 19 are similarly formed on a plate 23 connected at its opposed ends to the adjacent side of the carriage 17 by spring fasteners 24. This allows for adjustment of the roller pressure on the guides 18 and also prevents foreign matter (such as may enter the housing 11 in spite of the seals 11″) on the guides from restricting operation or jamming the mechanism.

The upper sidewall or top of the carriage 17 is slotted as at 25 to receive and mount a drive mechanism that connects the carriage 17 to the box beam 14 and by which its relative position thereon is adjusted. This mechanism consists of a gear box 26 secured to the upper surface of the carriage 17 by appropriate fasteners 27 with its interior in communication with the interior of the box beam 14 through the slot 25 in the carriage 17 and an elongated slot 28 in the associated side of the beam 14. This gear box 26 carries a pair of spaced depending ears 29 which extend through the slots 25 and 28 and rotatably mount therebetween a drive gear 30. This drive gear 30 is keyed or otherwise secured to one end of a screw 31 which extends the greater length of the beam 14 and terminates beyond the outer end of the housing 11 in an enlarged head 32. The screw 31 is disposed adjacent the inner surface of the upper carriage side substantially filling the slot 28 in the associated wall of the beam 14 and passes through a nut 33 secured in any appropriate manner to the outer end of the box beam 14.

Internally, the gear box 26 contains a worm gear 34 mounted in customary manner on a driven shaft 35 for rotation in a fixed plane. The worm gear 34 is in constant mesh relation with the drive gear 30 of the screw 31 so that rotation of the gear 34 by whatever means adjusts the position of the screw 31 in its nut 33 and the position of the beam 14 in the carriage 17 as well. Preferably, such gear rotation is effected electrically through a suitable motor (not shown), the operation of which is controlled by a remote connection located within the cabin C of the vehicle.

A depending arm 36 mounted on and projecting from the under surface of the lower side of the carriage 17 terminates in a clevis 37 adapted to operatively engage and connect a push-pull rod 38 which in turn connects to a remote, controlled member (not shown). An elongated slot 39 is cut in the lower side or bottom of the housing 11 to permit the passage of the arm 36 therethrough at all positions of movement of the carriage 17 relative thereto upon adjustment of the beam 14 through operation of the drive mechanism as described. The rod 38 is thus disposed within the space, and extends through the passages, defined by the floor surfaces 12 and 13.

In view of the foregoing construction and arrangement, it will now be apparent that the position of the pedal 16 linearly relative to the cabin C is adjustable for the comfort and convenience of the operator of the vehicle by operation of the drive mechanism or gear box 26. In such adjustment the beam 14 is made to reciprocate relative to the housing 11 without effecting movement of the carriage 17 and the rod 38. When a force $F_1$ is applied to the pedal 16, the beam 14 and carriage 17 are translated as a unit moving on the rollers 20 in the housing 11 since the carriage 17 and beam 14 are interconnected through nut 33, screw 31, and meshing gears 30 and 34. The rod 38 is thereby actuated accordingly.

The second remote controlled member (not shown) is connected to the pedal 16 through a separate connection effected through a shaft 40 disposed within and passing through the entire length of the beam 14. This shaft 40 is formed by a splined rod 41 coaxially mounted within a sleeve 42 to project from one end thereof. At its outer end the sleeve 42 is provided with a fitting 43 by which it is connectible to the second controlled member in torque transfer relation as at 44.

At its inner end the sleeve 42 carries a ball-lined bearing 45 adapted for coaction with the splined rod 41 whereby the latter is free for telescoping movement relative to the former and held in positive manner for rotation therewith. At its free end remote from the sleeve 42, the rod 41 passes through a self-aligning bearing 46 provided therefor in the end wall of the beam 14 and terminates externally thereof. A crank 47 projecting from this end of the rod 41 pivotally connects to a link 48, the other end of which is similarly connected as at F′ to the pedal 16 remote from the fulcrum F thereof. This link 48 is adjustable in length through conventional means such as a turnbuckle 49 for the angular disposition of the pedal 16 to satisfy the particular operator or pilot.

Due to the telescopic arrangement in the length of the shaft 40 effected by the ball-lined bearing 45, neither the adjustment of the pedal position through operation of the gear box 26 nor actuation of the rod 38 through the application of the linear force $F_1$ results in movement of the second remote controlled member through the connection 44, since in either case the rod 41 merely slides relative to sleeve 42. When, however, a depressing force $F_2$ is applied to the pedal 16 about pivot point F the shaft 40 is rotated by the link 48 and crank 47 and such force is transmitted to the second controlled member through torque connection 44. This rotation of the shaft 40 is free and independent of the beam 14 and completely ineffective on the rod 38 associated with the first controlled member.

While a preferred embodiment of the invention has been hereinabove illustrated and described, the invention admits to various modifications and deviations which will be obvious to those skilled in the art without departing from the underlying concept. Such modifications and deviations as fall within the true scope and spirit of this invention are intended to be covered by the appended claims which alone limit the invention.

What is claimed is:

1. A connecting mechanism between a control lever and multiple controlled members comprising a beam, a first pivotal connection at one end of said beam for engagement with said lever, a second pivotal connection carried by said beam for engagement with one of said members, a linearly adjustable shaft disposed parallel to said beam, a crank on one end of said shaft, a link pivotally connecting the outer end of said crank to said lever in spaced relation to said first pivotal connection, and torque transfer means connectable to another of said members connected to the outer end of said shaft.

2. The mechanism of claim 1 wherein said link is adjustable in length.

3. The mechanism of claim 1 including a linearly movable carriage slidable on said beam, an arm extending from said carriage and mounting said second pivotal connection thereto, and adjustable engagement operative between said beam and said carriage to locate and secure them one to the other in a fixed, relative position and thereby establish the effective length of said beam.

4. The mechanism of claim 3 including complementary coacting surfaces between said beam and said carriage and between said carriage and associated stationary structure to prevent all relative lateral movement therebetween.

5. The mechanism of claim 3 including a housing surrounding and substantially enclosing said beam, at least one guide rail carried by and substantially coextensive with said housing and a plurality of rollers carried by said carriage and coacting with each said guide rail.

6. The mechanism of claim 5 including fixed mounts on said carriage to connect selected ones of said rollers thereto and resilient mounts on said carriage to connect the remaining rollers thereto.

7. A connecting mechanism between a control lever and independent controlled members comprising a pair of individual links, connections adjacent the opposed ends of each of said links adapted to engage said lever and one of the respective members, said connections between said lever and the first of said members effecting linear transfer relation therebetween and said connections between said lever and the second of said members effecting torque transfer relation therebetween, and a slidable engagement in the length of each of said links concurrently operative to adjust the effective length thereof.

8. The mechanism of claim 7 wherein one of said links comprises a hollow beam and the other of said links comprises a shaft disposed within said beam.

9. The mechanism of claim 7 wherein said connections at corresponding ends of said links adapted to engage said lever comprise an integral arm on said beam pivotally connected at its outer end to said lever at one end thereof and a lateral arm on said shaft linked at its outer end to said lever remote from said one end, the arms being actuated by coplanar movements of the control lever, and said connections at corresponding ends of said links adapted to engage said members comprise an arm on said beam pivotally connected at its outer end to said first member and a torque transfer connector on said shaft connectable at its outer end to said second member.

10. The mechanism of claim 9 wherein said lateral arm on said shaft is linked to said lever by a link adjustable in length.

11. The mechanism of claim 9 wherein the position of the arm on said beam connected to said first member as aforesaid is adjustable.

References Cited

UNITED STATES PATENTS

| | | | |
|---|---|---|---|
| 1,611,236 | 12/1926 | Rodgers | 74—471 |
| 1,910,412 | 5/1933 | Staude | 74—512 |
| 2,393,892 | 1/1946 | Ganahl | 74—471 |
| 2,433,146 | 12/1947 | Odell | 244—86 |
| 2,610,006 | 9/1952 | Boyce | 74—512 |
| 3,209,612 | 10/1965 | Tonnies | 74—471 |

FOREIGN PATENTS

| | | |
|---|---|---|
| 546,210 | 7/1942 | Great Britain. |
| 804,649 | 11/1958 | Great Britain. |

FRED C. MATTERN, JR., *Primary Examiner.*

C. F. GREEN, *Assistant Examiner.*